United States Patent
Yamazaki et al.

(10) Patent No.: US 10,793,935 B2
(45) Date of Patent: Oct. 6, 2020

(54) CARBON-CONTAINING STEEL MATERIAL AND METHOD FOR PRODUCING SAME

(71) Applicant: CITIZEN WATCH CO., LTD., Tokyo (JP)

(72) Inventors: Haruko Yamazaki, Tokyo (JP); Yoshiro Hirai, Saitama (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 298 days.

(21) Appl. No.: 15/539,559

(22) PCT Filed: Dec. 17, 2015

(86) PCT No.: PCT/JP2015/085378
§ 371 (c)(1),
(2) Date: Jun. 23, 2017

(87) PCT Pub. No.: WO2016/104329
PCT Pub. Date: Jun. 30, 2016

(65) Prior Publication Data
US 2018/0334736 A1    Nov. 22, 2018

(30) Foreign Application Priority Data
Dec. 24, 2014    (JP) .................. 2014-261363

(51) Int. Cl.
*C22C 38/00* (2006.01)
*C23C 8/80* (2006.01)
(Continued)

(52) U.S. Cl.
CPC .............. *C22C 38/004* (2013.01); *B05D 7/14* (2013.01); *B05D 7/24* (2013.01); *C23C 8/14* (2013.01);
(Continued)

(58) Field of Classification Search
CPC ........... C22C 38/004; C23C 8/80; C23C 8/14; C23C 28/00; F16B 33/06; B05D 7/14; B05D 7/24
See application file for complete search history.

(56) References Cited

U.S. PATENT DOCUMENTS

| | | | |
|---|---|---|---|
| 6,726,994 B1 * | 4/2004 | Araki | B32B 27/06 428/411.1 |
| 2003/0138648 A1 * | 7/2003 | Bianco | C23C 8/14 428/469 |
| 2007/0251605 A1 | 11/2007 | Kim | |

FOREIGN PATENT DOCUMENTS

| CN | 1422975 A | 6/2003 |
|---|---|---|
| CN | 1995440 A | 7/2007 |

(Continued)

OTHER PUBLICATIONS

Steven E. Hughes; A Quick Guide to Welding and Weld Inspection; Chapter 4—Materials and Their Weldability; Woodhead Publishing Series in Welding and Other Joining Technologies 2009, pp. 36-48 (Year: 2009).*

(Continued)

*Primary Examiner* — Humera N. Sheikh
*Assistant Examiner* — Elizabeth D Ivey

(57) ABSTRACT

An object of the present invention is to provide a clock screw having a deep interference film blue color that contributes to decorativeness while also having superior scratch resistance and corrosion resistance, and a method for producing the same. The means for solving provided by the present invention consists of: a clock screw comprising a screw base material made of steel containing carbon at 0.5% by weight to 1.0% by weight, an oxide layer of the steel on the screw base material having a thickness of 60 nm to 80 nm, and a fluorine coating film on the oxide layer; and, a method for producing the clock screw comprising: a step for (Continued)

ELECTRON MICROGRAPH IN WHICH PINHOLES WERE OBSERVED IN CLOCK SCREW OF PRESENT INVENTION preparing the screw base material, a step for forming the oxide layer by heating the screw base material for 30 minutes or longer at a temperature of 300° C. or lower in an air atmosphere, and a step for forming the fluorine coating film on the oxide layer.

7 Claims, 1 Drawing Sheet

(51) Int. Cl.
    *C23C 8/14*     (2006.01)
    *C23C 28/00*     (2006.01)
    *F16B 33/06*     (2006.01)
    *B05D 7/14*     (2006.01)
    *B05D 7/24*     (2006.01)

(52) U.S. Cl.
    CPC ................ *C23C 8/80* (2013.01); *C23C 28/00* (2013.01); *F16B 33/06* (2013.01)

(56) References Cited

FOREIGN PATENT DOCUMENTS

| CN | 101067194 A | 11/2007 | | |
| --- | --- | --- | --- | --- |
| CN | 102198591 A | 9/2011 | | |
| CN | 103374696 A | 10/2013 | | |
| JP | S48-072549 A | 9/1973 | | |
| JP | S58-045374 A | 3/1983 | | |
| JP | H09-157828 A | 6/1997 | | |
| JP | 2010-077457 A | 4/2010 | | |
| JP | 2010077457 A | * | 4/2010 | |
| JP | 2012140580 A | * | 7/2012 | |
| WO | WO-2014198466 A2 | * | 12/2014 | ............. C22C 38/58 |

OTHER PUBLICATIONS

Bib data and translation: WO-2014198466-A2; Charbon Christian et al; Dec. 2014 (Year: 2014).*
Bib data and translation: JP-2012140580-A; Hozumi, Atsushi et al; Jul. 2012 (Year: 2012).*
Machine Translation—JP-2010077457-A; Suzuki, Katsumi; Apr. 2010 (Year: 2010).*
State Intellectual Property Office of the People's Republic of China, First Office Action for CN patent application No. 201580069834.0, dated Aug. 2, 2018.
China National Intellectual Property Administration, The Second Office Action for Chinese Application No. 201580069834.0, dated Feb. 11, 2019.
International Search Report for PCT/JP2015/085378, dated Feb. 16, 2016.
Written Opinion of the International Searching Authority for PCT/JP2015/085378, dated Feb. 16, 2016.
Ichihara et al., "Analysis of Decarburization Phenomena during Heating and Rolling of Billets", Sanyo Special Steel Technical Report vol. 8, Jun. 2001, pp. 43-50.

* cited by examiner

ELECTRON MICROGRAPH IN WHICH PINHOLES WERE OBSERVED IN CLOCK SCREW OF PRESENT INVENTION

ELECTRON MICROGRAPH IN WHICH PINHOLES WERE OBSERVED IN A CLOCK SCREW OF A COMPARATIVE EXAMPLE

CARBON-CONTAINING STEEL MATERIAL AND METHOD FOR PRODUCING SAME

TECHNICAL FIELD

The present invention relates to a clock screw. More particularly, the clock screw of the present invention is a clock screw having deep interference film blue color that contributes to decorativeness as well as superior scratch resistance and corrosion resistance.

In addition, the present invention relates to a method for producing the aforementioned clock screw. More particularly, the production method of the present invention enables the aforementioned clock screw to be easily produced in large volume.

BACKGROUND ART

Decorative articles such as clocks are required to have superior aesthetic appearance in addition to practicality in the manner of accuracy and durability. Blue color is a popular color, and the blue color produced by interference color is preferred due to its deep, rich high-grade appearance.

Coating processing, wet plating processing or dry plating processing have conventionally been used to color articles such as iron clock hands or iron clock screws. Among these methods, colors obtained by coating processing or wet plating processing are spontaneously occurring colors, while interference colors are unable to be obtained. In addition, although interference colors produced by a transparent film can be obtained by dry plating processing, the resulting color is not a deep interference film blue color. In addition, since dry plating processing requires the use of a vacuum device, there was also the problem of increased costs, and since it also requires that individual base materials for forming a uniform film be arranged in jigs within the device, this method also had the problem of being extremely time-consuming and labor-intensive.

Patent Document 1 discloses the formation of an iron oxide layer (colored layer) by subjecting a pure iron clock hand to heat treatment for several tens of seconds at 300° C. to 450° C. in air to oxidize the surface of a base material as a technology for obtaining a clock hand having a deep interference film blue color.

PRIOR ART DOCUMENTS

Patent Documents

Patent Document 1: Japanese Unexamined Patent Publication No. 2010-77457

Non-Patent Documents

Non-Patent Document 1: A. Ishihara and Y. Nuri (June 2001): Analysis of Decarburization Phenomena of Hot-Rolled Steel, Sanyo Special Steel Technical Report Volume 8, p. 43-50

DISCLOSURE OF THE INVENTION

Problems to be Solved by the Invention

Watch screws are required that have a deep interference film blue color that produces a superior aesthetic appearance. On the other hand, clock screws are obviously tightened and loosened during the course of clock production and maintenance. Since the screws, and particularly the screw head and thread grooves, are subjected to considerable stress, they are required to have sufficient strength, and especially surface hardness, to be able to withstand that stress. If they do not, the surface of the screw is easily damaged. Consequently, carbon steel or cemented steel that has undergone quenching and tempering is typically used for the base material of these screws.

In the case of oxidizing an iron clock screw containing carbon (C) in this manner by heat-treating for several tens of seconds at 300° C. to 450° C. in air in accordance with that taught in Patent Document 1, although the resulting clock screw has a deep interference film blue color, it has extremely poor corrosion resistance. More specifically, rust formed when this clock screw was exposed to a high-temperature, high-humidity environment (temperature: 40° C., humidity: 90% RH) for 24 hours.

While not wishing to be bound by any particular theory, the following is thought to be responsible for this extremely poor corrosion resistance. When the iron oxide layer (colored layer) formed by oxidizing the surface of the base material was observed, numerous pinholes were confirmed. The extremely poor corrosion resistance is thought to be due to corrosion of the base material proceeding easily by using these pinholes as starting points.

The reason for the formation of numerous pinholes is thought to be attributable to the carbon fraction contained in the base material being converted to CO or $CO_2$ during heat treatment for forming the colored layer, and the locations where the carbon was eliminated from the surface of the base material as a result thereof becoming voids that end up forming pinholes. Non-Patent Document 1 describes that the greater the increase in the amount of C in the base material, the larger the amount of CO or $CO_2$ gas generated, and that as a result thereof, the incidence of voids at the interface with the base material becomes higher.

An object of the present invention is to provide a clock screw that has a deep interference film blue color that contributes to decorativeness while also having superior scratch resistance and corrosion resistance. In addition, an object of the present invention is to provide a method for producing this clock screw, and particularly a method that allows this clock screw to be easily produced in large volume.

Means for Solving the Problems

The following are provided by the present invention.

[1] A clock screw, comprising: a screw base material made of steel containing carbon at 0.5% by weight to 1.0% by weight, an oxide layer of the steel on the screw base material having a thickness of 60 nm to 80 nm, and a fluorine coating film on the oxide layer.

[2] The clock screw described in [1], wherein the oxide layer has 10 or fewer pinholes having a diameter of 0.3 μm or more per square surface area having a side of 50 μm.

[3] The clock screw described in [1] or [2], wherein the thickness of the fluorine coating film is 2 nm to 6 nm.

[4] The clock screw described in any of [1] to [3], wherein the surface hardness of the screw base material is Hv 500 to Hv 700.

[5] A method for producing the clock screw described in any of [1] to [4], comprising:
  a step for preparing the screw base material,
  a step for heating the screw base material for 30 minutes or longer at a temperature of 300° C. or lower in an air atmosphere, to form the oxide layer, and
  a step for forming the fluorine coating film on the oxide layer.

[6] The production method described in [5], wherein the heating time is 6 hours or less.

[7] The production method described in [5] or [6], further comprising a step for quenching and tempering the screw base material prior to the heating step.

[8] The production method described in any of [5] to [7], wherein 1000 or more of the screw base materials are heated simultaneously in the heating step.

Effects of the Invention

According to the present invention, a clock screw is provided that has a deep interference film blue color that contributes to decorativeness, and has superior scratch resistance and corrosion resistance. In addition, according to the present invention, a method for producing this clock screw is provided, and more particularly, a method is provided that allows this clock screw to be easily produced in large volume.

BEST MODE FOR CARRYING OUT THE INVENTION

Figure 1:
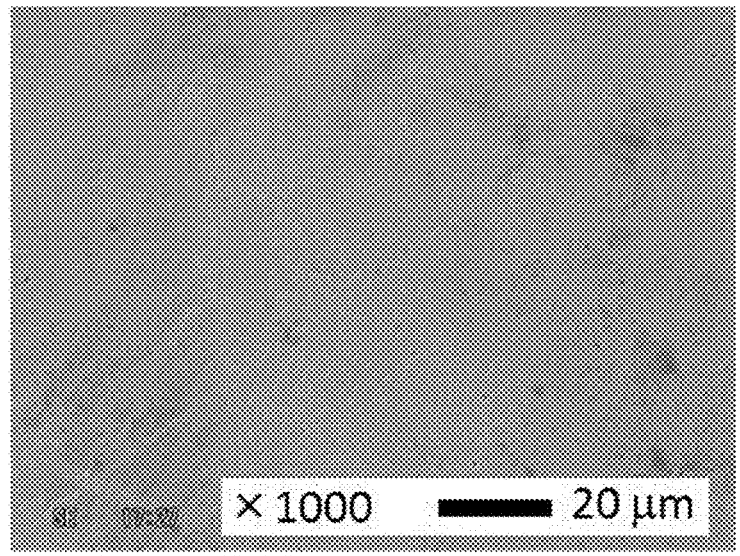
FIG. 1 is an electron micrograph in which pinholes were observed in the clock screw of the present invention.

The clock screw according to the present invention comprises a screw base material made of steel containing carbon at 0.5% by weight to 1.0% by weight, an oxide layer of the steel on the screw base material having a thickness of 60 nm to 80 nm, and a fluorine coating film on the oxide layer.

The clock screw according to the present invention is required to have a screw base material made of steel that contains carbon at 0.5% by weight to 1.0% by weight. In the description of the present application, a screw base material refers to a steel material processed into the shape of a screw that contains carbon at 0.5% by weight to 1.0% by weight. Hardness and tensile strength of the steel material are improved as a result of containing carbon therein. Surface hardness of the steel material containing carbon can be further enhanced by subjecting to quenching and tempering. If the carbon content is excessively low, since the effect of improving hardness and strength is inadequate, the lower limit of the carbon content is 0.5% by weight. However, if the carbon content is excessively high, tenacity of the steel material may decrease. In addition, as will be subsequently described, there is increased susceptibility to the formation of rust attributable to the formation of numerous pinholes in the oxide layer of the screw base material due to decarburization of carbon. Thus, the upper limit of carbon content is 1.0% by weight. A screw base material having a carbon content within this range has adequate strength and hardness as well as superior scratch resistance. Although there are no particular limitations on the size of the screw material in the invention of the present application, since the screw is used as a clock screw, the screw diameter is roughly 0.4 mm to 1.0 mm and the total screw length is roughly 1.0 mm to 3.0 mm.

Furthermore, the screw of the present invention has a fluorine coating film, and scratch resistance is also improved by this fluorine coating film as will be subsequently described.

There are no particular limitations on the steel material provided it has the aforementioned carbon content, and a commercially available carbon tool steel or cemented steel may be used in consideration of availability, processability and quenching and tempering properties.

The surface hardness of the screw base material in terms of the Vickers hardness thereof (Hv: measured with a micro Vickers hardness tester at a load of 5 g and holding time of 10 seconds) is 500 to 700. Since the screw base material contains carbon, a desired surface hardness can be realized by subjecting the screw base material to quenching and tempering. If the hardness is less than Hv 500, strength is inadequate for practical use as a screw. Although there are no particular limitations on the upper limit of Vickers hardness, if Vickers hardness is attempted to be increased in a steel material having a carbon content of 1.0% by weight or less, there is the risk of the occurrence of problems such as decreased tenacity. Consequently, the upper limit of Vickers hardness is 700.

The clock screw of the present invention is required to have an oxide layer obtained by oxidation of the aforementioned screw base material at a thickness of 60 nm to 80 nm on the surface of the screw base material. This oxide layer brings about the deep interference film blue color that contributes to decorativeness. Since this blue color contains color that is realized by interference, if the thickness of the oxide layer is excessively thin or excessively thick, the desired blue color cannot be obtained. If the thickness of the oxide layer is less than 60 nm, clear, dark violet or violet color is produced, while if the thickness of the oxide layer exceeds 80 nm, violet, green, yellow or red color is produced. Consequently, the thickness of the oxide layer is made to be 60 nm to 80 nm.

Pinholes may be present in the surface of the oxide layer. This is because, although the oxide layer can be obtained by oxidizing the surface of the screw base material by heat-treating the screw base material, those locations where the carbon fraction contained in the screw material is converted to CO or $CO_2$ during this heat treatment causing carbon (C) to be eliminated from the surface thereof become voids that end up forming pinholes. If pinholes are present in the surface of the oxide layer, corrosion of the base material proceeds easily by using these pinholes as starting points thereby resulting in poor corrosion resistance. However, as will be subsequently described, the screw of the present invention contains a fluorine coating film on the oxide layer, and superior corrosion resistance is ensured by this fluorine coating film.

In order to further enhance corrosion resistance, the number of pinholes in the oxide layer having a diameter at the opening in the surface thereof of 0.3 μm or more is made to be 10 or less per surface area measuring 50 μm on a side. If the number of pinholes is within this range, the number of pinholes present in the surface of the oxide layer is sufficiently small, it becomes more difficult for corrosion of the base material to proceed, and corrosion resistance is further improved.

The oxide layer can be obtained by oxidizing the surface of the screw base material by heat-treating the screw base material in air. As a result of conducting extensive studies, the inventors of the present invention found that a desired oxide can be obtained by employing heating conditions for obtaining the oxide layer consisting of heating the screw base material for 30 minutes or longer at 300° C. or lower in air. If the temperature exceeds 300° C., oxidation proceeds excessively, the oxide layer becomes excessively thick, and the desired blue color is unable to be obtained. The thickness of the oxide layer is thought to be able to be adjusted by shortening heating time even if the temperature is 300° C. or higher. In Patent Document 1, for example, a pure iron clock hand not containing carbon is subjected to heat treatment for several tens of seconds in air at 300° C. to 450° C. However, if a screw base material containing carbon is heated at 300° C. or higher, a large number of pinholes easily form in the surface of the oxide layer and corrosion resistance becomes poor. Although this phenomenon of the carbon fraction contained in the screw base material being converted to CO or $CO_2$ and the locations where carbon (C) is eliminated from the surface of the base material becoming voids resulting in the formation of pinholes is observed immediately after the start of heating, pinholes in the screw base material are surprisingly closed up as a result of continuing to heat for 30 minutes or more. This is due to the iron of the screw base material (steel material) reacting with oxygen in the air to form an oxide layer that closes up the pinholes. This surprising phenomenon was discovered by the inventors of the present invention. On the basis of this phenomenon, an oxide layer can be obtained that has a desired blue color as well as superior corrosion resistance with few pinholes by heating for 30 minutes or more at a temperature of 300° C. or lower.

Although there are no particular limitations on the heating temperature provided it is a temperature that allows the formation of an oxide layer on the screw base material (steel material), if the heating temperature is excessively low, more time is required to form the oxide layer, and since this leads to a decrease in productivity, the lower limit of heating temperature is 240° C.

In addition, if the heating time is excessively long, since this also leads to a decrease in productivity, the upper limit of heating time is 6 hours. The upper limit of heating time is more preferably 4.5 hours.

In addition, thickness of the oxide layer is thought to demonstrate a positive correlation with heating temperature and heating time. In other words, the oxide layer is thought to become thicker as heating temperature becomes higher, and the oxide layer is thought to become thicker the longer the heating time. Thus, more suitable heating conditions may be set by combining heating temperature and heating time. If the screw base material is excessively large or excessively small, changes in heating conditions (heat transfer conditions) or atmospheric conditions become large resulting in the risk of the occurrence of variations in the thickness of the oxide layer. If the screw base material has a screw diameter of 0.4 mm to 1.0 mm and total screw length of 1.0 mm to 3.0 mm, there are no large changes in heating conditions (heat transfer conditions) or atmospheric conditions, there is no occurrence of variations in thickness of the oxide layer, and a uniform deep interference blue color is produced.

These heating conditions can also be applied to simultaneous treatment of 1000 or more of the screw base materials. Since the screw base material is heated for 30 minutes or more, homogeneous heating conditions can be provided for each of the 1000 or more screw base materials and a uniform deep interference blue color can be produced without the occurrence of variations in thickness of the oxide layer. Homogeneously heating 1000 or more screw base materials simultaneously is difficult in the case of heating for several tens of seconds in the manner of Patent Document 1.

The surface of the screw base material may be cleaned prior to forming the oxide layer on the surface thereof. Since rust may form on the screw base material during the time it is exposed to air, it is preferable to clean the surface of the screw base material in order to form a uniform oxide layer. There are no particular limitations on the method used to clean the screw base material, and an ordinary method used to clean steel materials can be used. For example, alkaline cleaning, acid cleaning, rinsing with pure water, alcohol cleaning or ultrasonic cleaning may be used, and these methods may also be suitably combined.

The clock screw of the present invention is required to have a fluorine coating film on the surface of the aforementioned oxide layer. Examples of the raw material of the fluorine coating layer include, but are not limited to, fluorine-based resins such as fluorinated polyolefins, polytetrafluoroethylene, polyvinylidene fluoride and copolymers of copolymerization products thereof. The surface of the oxide layer can be uniformly coated with a fluorine layer by dip-coating a liquid coating material containing a fluorine-based resin onto the screw base material provided with the oxide layer followed by drying this coating material. Superior scratch resistance and corrosion resistance are realized by providing a fluorine coating of a fluorine-based resin on the surface of the oxide layer. In addition, the fluorine coating film can be made to be sufficiently thin and not impair the deep interference blue color. Superior scratch resistance and corrosion resistance can be demonstrated despite the use of a thin fluorine coating film. There are no particular limitations on the thickness of the fluorine coating film provided it does not impair the deep interference blue color and demonstrates superior scratch resistance and corrosion resistance, and may be 2 nm to 6 nm. If the thickness of the fluorine coating film is less than 2 nm, there is the risk of a decrease in scratch resistance and corrosion resistance, while if the thickness exceeds 6 nm, there is the risk of the oxide layer having an effect on the interference blue color. Furthermore, the oxide layer may have pinholes to a degree that does not have an effect on corrosion resistance, and due to the generation of an anchoring effect as a result of the fluorine coating layer entering the pinholes, the fluorine coating layer is more securely adhered to the oxide layer, making it possible to further improve corrosion resistance and scratch resistance. In order to reliably obtain this anchoring effect, one or more pinholes having a diameter of the opening in the surface of 0.3 μm or more may be present per surface area measuring 50 μm on a side. However, if the number of pinholes is excessively large, corrosive action is promoted by the pinholes, thereby preventing the obtaining of superior corrosion resistance and scratch resistance despite the protective action of the fluorine coating film.

The surface of the screw base material (oxide layer) may be cleaned prior to carrying out fluorine coating treatment on the surface of the oxide layer. This facilitates homogeneous dip coating of the fluorine coating resulting in a uniform deep interference blue color. Although the aforementioned method used to clean the screw base material prior to forming the oxide layer may be used for the cleaning method, a mild cleaning method is used preferably so as not to remove the comparatively thin oxide layer. Cleaning may be carried out by ultrasonic cleaning in an alcohol solution such as ethanol.

EXAMPLES

The following provides a detailed explanation of the present invention using the examples indicated below. However, the present invention should not be understood to be limited by these examples.

A carbon tool steel in the form of SK95 (SK4) (JIS G 4401:2006) was cut to form screw base materials for a clock screw (screw diameter: 0.4 mm to 1.0 mm, total screw length: 1.0 mm to 3.0 mm). The resulting screw base materials were treated to have a hardness of Hv 650 by carrying out quenching and tempering.

The screw base materials were cleaned prior to heat treatment for forming an oxide layer (blue colored layer). This is because rust forms during the time the screw base materials are exposed to air resulting in the formation of an uneven oxide layer consisting of $Fe_2O_3$ on the surface of the screw base materials after preparing the screw base materials (after subjecting to quenching and tempering). More specifically, the screw base materials were immersed in an aqueous alkaline solution for 5 minutes followed by rinsing with pure water for 5 minutes, replacing the pure water with ethanol, and finally suction-drying for 3 minutes or more at a temperature of 100° C. or lower using an air suction dryer.

Heat treatment was then carried out for obtaining an oxide layer having a deep interference film blue color. The heating conditions were as shown in Table 1. Heat treatment of the screw base materials was carried out in an air circulation-type atmospheric furnace capable of simultaneously treating the screw base materials in units of several thousand each.

After having subjected the screw base materials provided with an oxide layer to ultrasonic cleaning in ethanol and drying, the screw base materials were dip-coated with a fluorine resin coating material (Durasurf DS5210TH, Harves Co., Ltd.) followed by drying the coating material to provide a fluorine coating on the surface of the oxide layer.

Screw base materials heated under heat treatment conditions outside the scope of the present invention were used as comparative examples (see Table 2). In addition, screw base materials that were not coated with a fluorine coating were also prepared for use as comparative examples.

Clock screws fabricated in the examples and comparative examples were evaluated in the manner indicated below.

(1) Observation of Surface Pinholes: Pinholes present in the surface of the clock screws were observed using a scanning electron microscope (magnification factor: 1000×). A "O" indicates that there were 10 or fewer pinholes having a diameter of the opening in the surface of 0.3 μm or more per surface area measuring 50 μm on a side. An "X" indicates that more than 10 pinholes were observed.

(2) Corrosion Resistance: The clock screws were visually confirmed for the formation of rust after a prescribed amount of time in an atmosphere at a temperature of 40° C. and humidity of 90% RH. A "O" indicates that rust did not form. An "X" indicates that rust formed after 24 hours. A "Δ" indicates that rust was confirmed after 1 week.

(3) Scratch Resistance: Clocks may be handled somewhat roughly during the course of manual assembly work in the case of automated clock production. In order to evaluate the scratch resistance of the resulting clock screws, the clock screws were placed in a vibratory parts feeder of an automated clock assembly line followed by visually observing the surfaces of the clock screws for scratches. A "O" indicates that scratching did not occur. An "X" indicates that visually discernible scratches were present. A "Δ" indicates that scratches were only able to be confirmed with a stereoscopic microscope at a magnification of 10×.

(4) Overall Evaluation: If the evaluation results for the presence of pinholes, corrosion resistance and scratch resistance were all "O", then the clock screw was given an overall evaluation of "O". If the evaluation results were all "X", the clock screw was given an overall evaluation of "X". The clock screw was given an overall evaluation of "Δ" in all other cases.

TABLE 1

Conditions and Evaluation of Examples

| | Base Material | Heat Treatment Temp. (air) | Treatment time (h) | Pinholes (absent O, present: X) | Fluorine coating | Corrosion Resistance Test | Scratch Resistance Test | Overall Evaluation |
|---|---|---|---|---|---|---|---|---|
| Ex. 1 | Carbon tool steel/ cemented steel | 240° C. | 6 | O | Present | O | O | O |
| Ex. 2 | Carbon tool steel/ cemented steel | 245° C. | 5.5 | O | Present | O | O | O |
| Ex. 3 | Carbon tool steel/ cemented steel | 250° C. | 5 | O | Present | O | O | O |
| Ex. 4 | Carbon tool steel/ cemented steel | 250° C. | 4.5 | O | Present | O | O | O |
| Ex. 5 | Carbon tool steel/ cemented steel | 255° C. | 4.5 | O | Present | O | O | O |
| Ex. 6 | Carbon tool steel/ cemented steel | 260° C. | 4.25 | O | Present | O | O | O |
| Ex. 7 | Carbon tool steel/ cemented steel | 255° C. | 4 | O | Present | O | O | O |
| Ex. 8 | Carbon tool steel/ cemented steel | 260° C. | 4 | O | Present | O | O | O |
| Ex. 9 | Carbon tool steel/ cemented steel | 270° C. | 3.5 | O | Present | O | O | O |

TABLE 1-continued

Conditions and Evaluation of Examples

| | Base Material | Heat Treatment Temp. (air) | Treatment time (h) | Pinholes (absent ○, present: X) | Fluorine coating | Corrosion Resistance Test | Scratch Resistance Test | Overall Evaluation |
|---|---|---|---|---|---|---|---|---|
| Ex. 10 | Carbon tool steel/ cemented steel | 270° C. | 3 | ○ | Present | ○ | ○ | ○ |
| Ex. 11 | Carbon tool steel/ cemented steel | 265° C. | 3 | ○ | Present | ○ | ○ | ○ |
| Ex. 12 | Carbon tool steel/ cemented steel | 280° C. | 2.5 | ○ | Present | ○ | ○ | ○ |
| Ex. 13 | Carbon tool steel/ cemented steel | 285° C. | 2.5 | ○ | Present | ○ | ○ | ○ |
| Ex. 14 | Carbon tool steel/ cemented steel | 285° C. | 2 | ○ | Present | ○ | ○ | ○ |
| Ex. 15 | Carbon tool steel/ cemented steel | 290° C. | 1.5 | ○ | Present | ○ | ○ | ○ |
| Ex. 16 | Carbon tool steel/ cemented steel | 290° C. | 1 | ○ | Present | ○ | ○ | ○ |
| Ex. 17 | Carbon tool steel/ cemented steel | 300° C. | 0.5 | ○ | Present | ○ | ○ | ○ |

TABLE 2

Conditions and Evaluation of Comparative Examples

| | Base Material | Heat Treatment Temp. (air) | Treatment Time (h) | Pinholes (absent ○, present: X) | Fluorine Coating | Corrosion Resistance Test | Scratch Resistance Test | Overall Evaluation |
|---|---|---|---|---|---|---|---|---|
| Comp. Ex. 1 | Carbon tool steel/ cemented steel | 300° C. | 20 min | X | Present Absent | Δ X | Δ X | Δ X |
| Comp. Ex. 2 | Carbon tool steel/ cemented steel | 320° C. | 10 min | X | Present Absent | Δ X | Δ X | Δ X |
| Comp. Ex. 3 | Carbon tool steel/ cemented steel | 325° C. | 7 min | X | Present Absent | Δ X | Δ X | Δ X |
| Comp. Ex. 4 | Carbon tool steel/ cemented steel | 350° C. | 3 min | X | Present Absent | Δ X | Δ X | Δ X |
| Comp. Ex. 5 | Carbon tool steel/ cemented steel | 360° C. | 1 min 30 sec | X | Present Absent | Δ X | Δ X | Δ X |
| Comp. Ex. 6 | Carbon tool steel/ cemented steel | 370° C. | 50 sec | X | Present Absent | Δ X | Δ X | Δ X |

The clock screw of the present invention had a deep interference film blue color that contributes to decorativeness as well as superior scratch resistance and corrosion resistance. FIG. 1 is an electron micrograph in which pinholes were observed in the clock screw of the present invention.

Figure 2:
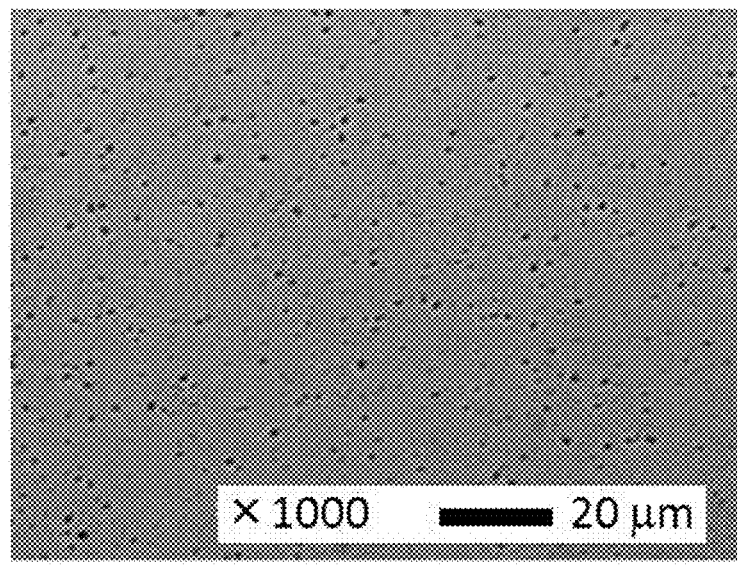
FIG. 2 is an electron micrograph in which pinholes were observed in a clock screw of a comparative example.

The thickness of the oxide layer in the comparative examples was adjusted to obtain a deep interference film blue color by subjecting to heat treatment at a higher temperature in comparison with that of the present invention and shortening heat treatment time accordingly. However, a large number of pinholes were present. FIG. 2 is an electron micrograph in which pinholes were observed in a clock screw of a comparative example. Consequently, the clock screws of the comparative examples demonstrated poor corrosion resistance and scratch resistance, and even if coated with a fluorine coating film, only allowed the obtaining of levels of corrosion resistance and scratch resistance that were lower than those of the present invention.

Furthermore, a clock screw fabricated under the same conditions as the examples with the exception of not providing a fluorine coating was also evaluated for reference purposes. Although the corrosion resistance and scratch resistance of the clock screw of this reference example were superior to those of the comparative examples, they were inferior to those of the examples.

The invention claimed is:

1. A carbon-containing steel material, comprising: a base material made of steel containing carbon at 0.5% by weight to 1.0% by weight, an oxide layer of the steel on the base material having a thickness of 60 nm to 80 nm, which brings about deep interference film blue color, and a fluorine coating film on the oxide layer, wherein the oxide layer has 10 or fewer pinholes having a diameter of 0.3 μm or more per a surface area having a dimension of 50 μm ×50 μm square.

2. The carbon-containing steel material according to claim 1, wherein the thickness of the fluorine coating film is 2 nm to 6 nm.

3. The carbon-containing steel material according to claim 1, wherein the surface hardness of the base material is Hv 500 to Hv 700.

4. A method for producing the carbon-containing steel material according to claim 1, comprising:
    a step for preparing the base material,
    a step for heating the base material for 30 minutes or longer at a temperature of 300° C. or lower in an air atmosphere, to form the oxide layer, and
    a step for forming the fluorine coating film on the oxide layer.

5. The production method according to claim 4, wherein the heating time is 6 hours or less.

6. The production method according to claim 4, further comprising a step for quenching and tempering the base material prior to the heating step.

7. The production method according to claim 4, wherein, in the heating step, 1000 or more of the base materials are heated simultaneously.

* * * * *